No. 898,204. PATENTED SEPT. 8, 1908.
F. C. FELLER.
DUMP CART.
APPLICATION FILED OCT. 23, 1907.
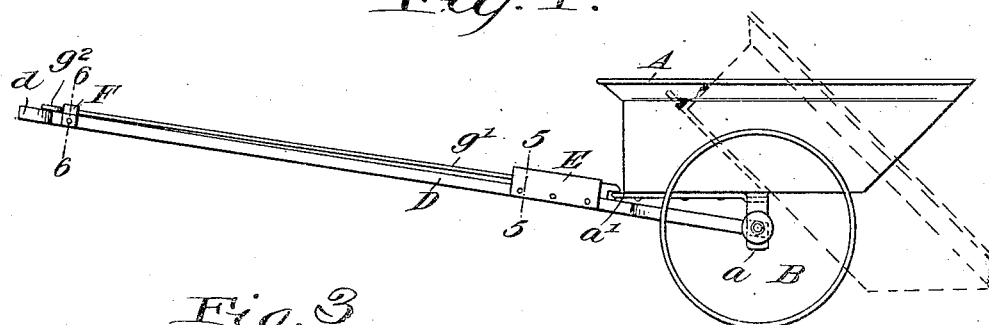
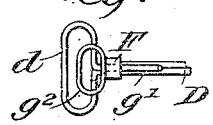
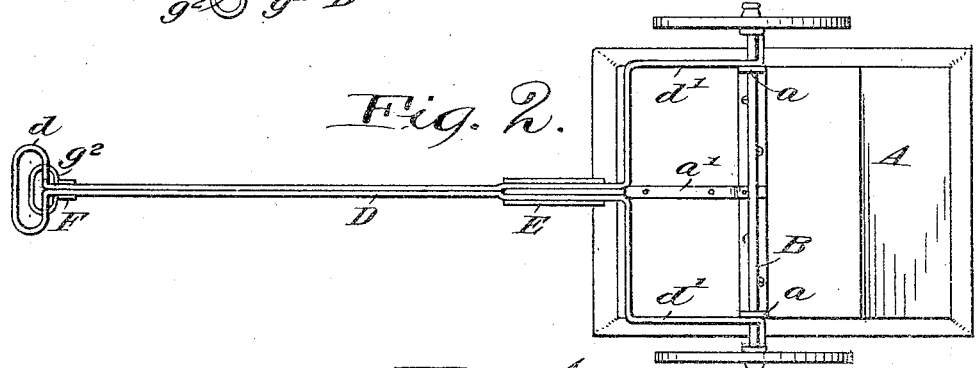
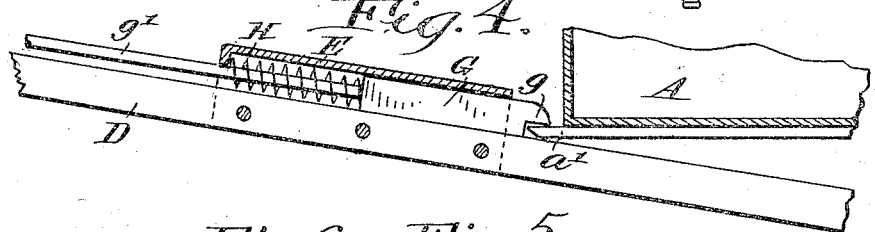
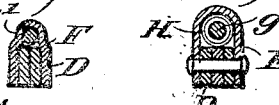
Witnesses.
E. B. Gilchrist
H. R. Sullivan
Inventor
Frank C. Feller
By Thurston & Woodward
Attorneys

UNITED STATES PATENT OFFICE.

FRANK C. FELLER, OF CLEVELAND, OHIO.

DUMP-CART.

No. 898,204.　　　Specification of Letters Patent.　　Patented Sept. 8, 1908.

Application filed October 23, 1907. Serial No. 398,696.

*To all whom it may concern:*

Be it known that I, FRANK C. FELLER, a citizen of the United States, residing at Cleveland, in the county of Cuyahoga and State of Ohio, have invented a certain new and useful Improvement in Dump-Carts, of which the following is a full, clear, and exact description.

The invention is especially adapted for use in connection with toy dump carts, and it consists of the novel combinations of parts hereinafter described and definitely pointed out in the claims.

In the drawing, Figure 1 is a side elevation of a dump cart embodying the invention. Fig. 2 is a bottom view thereof. Fig. 3 is a top plan view of the extreme end of the draft bar and the parts associated therewith; Fig. 4 is an enlarged view of the mechanism for preventing the cart body from tipping backward,—the bolt housing in this view being shown in section. Fig. 5 is a transverse sectional view in the plane indicated by line 5—5 on Fig. 1; and Fig. 6 is a transverse sectional view in the plane indicated by line 6—6 on Fig. 1.

Referring to the parts by letters, A represents the cart body; and $a$, $a$ represent two ears which project downward therefrom and serve as bearings for the axle B. These ears are in front of the center of gravity of the cart body, and therefore, unless restrained, said body tends to tip backward as shown by dotted lines in Fig. 1.

D represents the draft bar. It is made of a thin strip of metal, bent near its middle to form the loop or handle $d$. The two parts of the strip then extend in contact with each other rearward to the point near the front end of the cart body where they diverge and are then carried backward to form the bars $d'$. The ends of bars $d'$ are bent outward and made fast to the axle. The two parts of this draft bar are prevented from spreading apart by two straps E and F, which embrace them and are riveted to them. The strap E serves as a housing for a bolt G and its spring H. This bolt projects rearward from the housing and is provided with a lip $g$ which is adapted to engage over the top of the front end of a bar $a'$ which is attached to the bottom of the cart body and projects forward therefrom, resting upon the draft bar. The front end of the strap E is turned inward to form an abutment for the bolt operating spring coil H, which embraces a rod $g'$ attached to the bolt and extending forward therefrom. The other strap F serves as a guide for the front end of the rod $g'$, which at its front end is bent to form a loop $g^2$. This loop is conveniently adjacent to the handle loop $d$ of the draft bar.

Normally, the parts are held in the position shown in Fig. 1, but when one wishes to release the cart body and allow it to dump, he inserts his fingers in the loop $g^2$ and by pulling thereon draws the bolt G forward out of engagement with the bar $a'$, whereupon the body, being unrestrained, tips backward. When one wishes to return the body to its operative position relative to the other parts, he may, by taking hold of the loop $g^2$, pull the bolt G forward, and may, at the same time, swing the draft bar upward until it is in such position that when said bolt is released it will be moved by its spring into the described engagement with the bar $a'$.

Having described my invention, I claim:

1. The combination of a dump cart body having depending perforated ears and a forwardly extended bar $a'$, an axle rotatably mounted in said ears, a draft bar having at its rear end, two arms which are connected with the axle, a spring bolt mounted upon said draft bar and adapted to engage the top of said bar $a'$, and provided with a long attached rod which extends forward to a point near the end of the draft rod whereby it may be operated, substantially as and for the purpose specified.

2. The combination of a dump cart body having depending perforated ears and a forwardly extended bar $a'$, a draft bar comprising a metal strip doubled so as to bring the two parts into contact and bent in the middle to form a handle loop, which two parts are bent apart near their rear ends and then rearward to form the arms $d'$ which are connected with the axle, an axle rotatably mounted in said ears, the straps E and F embracing and secured to the two contacting parts of the draft bar and holding them together, one of said straps being in the form of a bolt housing, and the other being adapted to serve as a guide for a bolt operating rod, a spring bolt mounted in said housing and adapted to project therefrom rearward and to engage with the top of the bar $a'$, and a bolt operating rod connected with said bolt and extending forward out of the bolt housing and through the guide formed in the other strap and having an operating loop on its forward end arranged in convenient relation to the loop at the front end of the draft bar.

In testimony whereof, I hereunto affix my signature in the presence of two witnesses.

FRANK C. FELLER.

Witnesses:
 E. L. THURSTON,
 E. B. GILCHRIST.